United States Patent [19]
Hunt et al.

[11] Patent Number: 5,338,108
[45] Date of Patent: Aug. 16, 1994

[54] DISK STORAGE DEVICE

[76] Inventors: Ronald. E. Hunt, 211 Buck Bend Dr., Georgetown, Tex. 78628; Verlon E. Whitehead, 8815 Mesa Dr., Austin, Tex. 78759

[21] Appl. No.: 473

[22] Filed: Jan. 5, 1993

[51] Int. Cl.[5] .......................... A47B 81/06; A47F 1/04
[52] U.S. Cl. .................. 312/9.17; 312/9.22; 312/9.14
[58] Field of Search ............. 312/9.9, 9.11, 9.12, 312/9.14–9.15, 9.16–9.17, 9.19, 9.58–9.63, 9.21–9.22; 211/40; 360/133; 206/15, 307–309, 387

[56] References Cited

U.S. PATENT DOCUMENTS

| Re. 30,184 | 1/1980 | Ackeret | 312/319 X |
|---|---|---|---|
| 2,352,710 | 7/1944 | Hart | 312/19 |
| 2,539,647 | 1/1951 | Williams | 312/19 |
| 3,265,453 | 8/1966 | Seide | 312/13 |
| 3,391,792 | 7/1968 | Makar | 211/40 |
| 3,836,222 | 9/1974 | Kuntze | 206/387 X |
| 3,926,310 | 12/1975 | Ackert | 206/387 |
| 4,121,877 | 10/1978 | Brown | 312/19 |
| 4,609,231 | 9/1986 | Neuman | 312/15 |
| 4,630,732 | 12/1986 | Snyman | 211/40 X |
| 4,647,117 | 3/1987 | Ackeret | 211/40 X |
| 4,690,278 | 9/1987 | Uchiyama | 206/387 X |
| 4,695,103 | 9/1987 | MacDonald et al. | 312/18 |
| 4,875,743 | 10/1989 | Gelardi et al. | 312/13 |

*Primary Examiner*—Kenneth J. Dorner
*Assistant Examiner*—Nancy Mulcare
*Attorney, Agent, or Firm*—Charles D. Gunter, Jr.

[57] ABSTRACT

A disk storage device is shown of the type used to store computer floppy diskettes. A series of springs are utilized to urge a floppy disk outward from a storage slot provided in the body of the device. One corner of the floppy disk is utilized to temporarily restrain the disk within its associated storage slot. A moveable lever is utilized to lift the restraining corner of the floppy disk from behind the restraint and permit the spring loaded slot to eject the computer floppy disk.

5 Claims, 3 Drawing Sheets

DISK STORAGE DEVICE

BACKGROUND OF THE INVENTION

1. Field of the Invention

The present invention relates generally to storage containers of the type used to store floppy diskettes or similarly shaped objects, and particularly to such a container having means whereby one of a plurality of adjacent disks may be elevated for ease in removing that disk from the storage device.

2. Description of the Prior Art

Articles in the form of substantially flat, rectangular or square diskettes are commonly found in the office and work environment. The use of personal computers both in the home and office has steadily increased in recent years. Most such computers use flexible magnetic disks for information storage. While these disks are provided in various sizes, they all generally comprise a thin rotatable disk having a magnetically encodable surface. The disk is usually housed in a generally square cardboard pocket or plastic holder.

Since such floppy disks or floppy diskettes commonly contain not only stored information but application programs and other information related to the use of the computer, a single user will typically have a large number of floppy diskettes. The organized storage and retrieval of such diskettes offers obvious advantages in any computer environment.

There are other similarly shaped objects which likewise can benefit from an organized storage and retrieval system. For example, compact discs (referred to as CD's) are becoming increasingly popular as a medium for audio recording. The relatively fragile disc containing the audio recording is typically housed within a square or rectangular plastic container which has a similar shape to the plastic holder used with many of the computer floppy diskettes.

A need exists for a storage device for storing disk shaped objects which allows a user to quickly select and retrieve any desired disk from among all of the disks that may be at the user's disposal, while at the same time providing for safe storage of those disks that are not in use.

It is an object of the present invention to provide a disk storage device for storing disk shaped objects such as floppy diskettes in which the diskettes are not only stored safely and securely, but can be selected and retrieved from the device with a minimum amount of handling.

Another object of the invention is to provide a disk storage device of the type used to store floppy diskettes and similarly shaped objects which enables rapid and easy identification and retrieval of such objects from the storage device.

Another object of the invention is to provide a disk storage device in which each stored disk may be individually lifted above the adjacent stored disks and identified in order to facilitate removal.

SUMMARY OF THE INVENTION

A disk storage device is shown which includes a storage body having a top wall, a bottom wall, a rear wall and opposing sidewalls which together define an initially open interior. A plurality of dividers are located within the open interior of the storage body and extend generally perpendicular to the bottom wall thereof. The dividers are spaced apart a preselected distance within the open interior to thereby define a plurality of slots for receiving disks to be stored by the device. Biasing means are located within at least selected ones of the slots for normally urging a disk outwardly from a storage position, principally within the open interior, to an extended, retrieval position. The biasing means is moveable from a relaxed position to a tensed position as a disk is inserted into the slot. Retaining means are located on the storage body for engaging a portion of a disk located within a slot as the disk is moved to the storage position and the biasing means is moved to the tensed position. Release means are provided for disengaging the retaining means and allowing the biasing means to urge the disk outwardly from the storage position to the extended, retrieval position.

Preferably, the biasing means comprises a spring comb having a plurality of leaf spring teeth, each leaf spring tooth being associated with a selected slot within the open interior of the storage body. The storage body walls, when assembled, define an opening into the interior thereof. The retaining means is preferably a lip formed on the storage body adjacent the opening. The release means can conveniently comprise a lever slidably mounted on the storage body adjacent the retaining lip. The lever is pivotable between a relaxed position and an actuated position in contact with a portion of the disk being retrieved for urging the disk out of contact with the retaining lip. The lever can be individually indexed against individual slots in the storage body for retrieving disks stored therein on an individual basis as the lever slides along the lip region of the body.

The storage body can be provided with a pivoting lid attached thereto for closing the opening therein. The pivoting lid preferably has an inside surface which is adapted to receive a disk title card which provides a numbered index of stored disks within the slots provided in the open interior of the storage body. The disk storage device can also be provided with a base for receiving the storage body which orients the storage body at an angle to an associated support surface, whereby the opening into the interior thereof more directly faces a user of the device.

Additional objects, features and advantages will be apparent in the written description which follows.

DETAILED DESCRIPTION OF THE INVENTION

Figure 1:
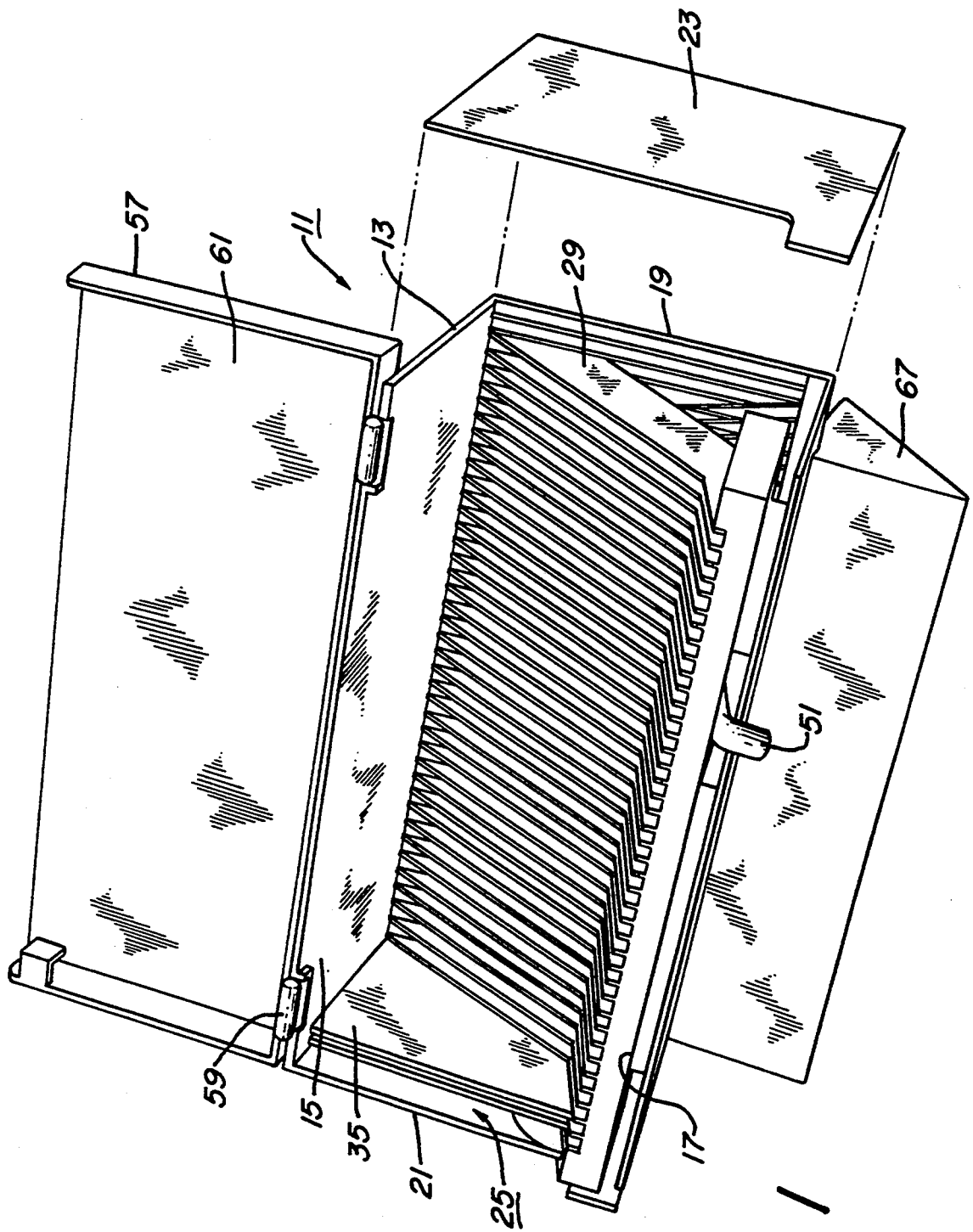
FIG. 1 is a perspective view, partially broken away, showing the disk storage device of the invention with the lid in the open position.

FIG. 1 shows a disk storage device of the invention designated generally as 11. The disk storage device 11 includes a storage body 13 having a top wall 15, a bottom wall 17, a rear wall 19, and opposing sidewalls 21, 23 which together define an initially open interior 25. The storage body walls, when assembled, define an opening 27 (FIG. 2) into the interior 25 thereof, whereby disk shaped objects to be stored may be inserted into the interior of the device.

Figure 2:
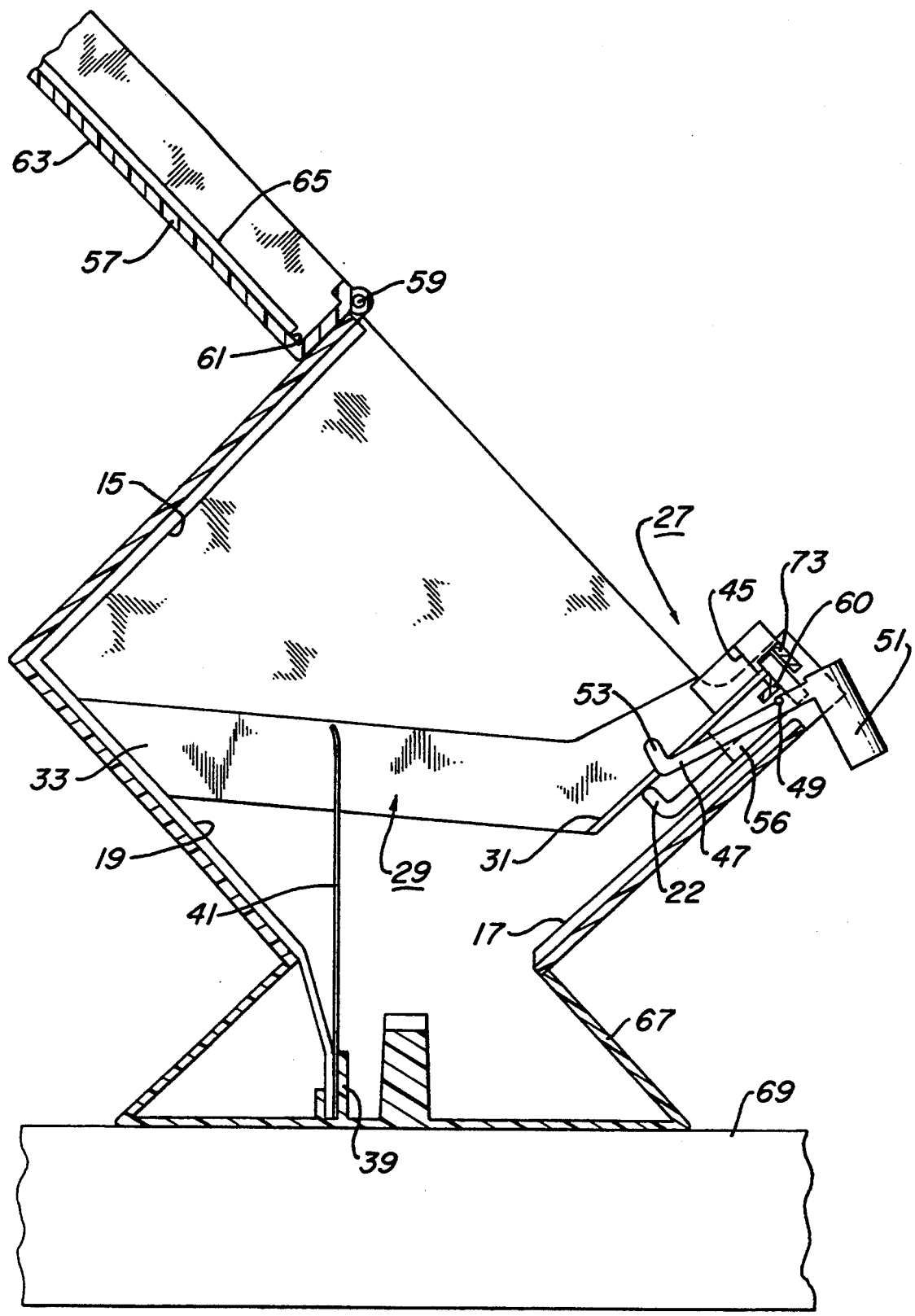
FIG. 2 is a cross-sectional view of the disk storage device of FIG. 1 showing the device prior to inserting a disk in the disk storage slot.
Figure 3:
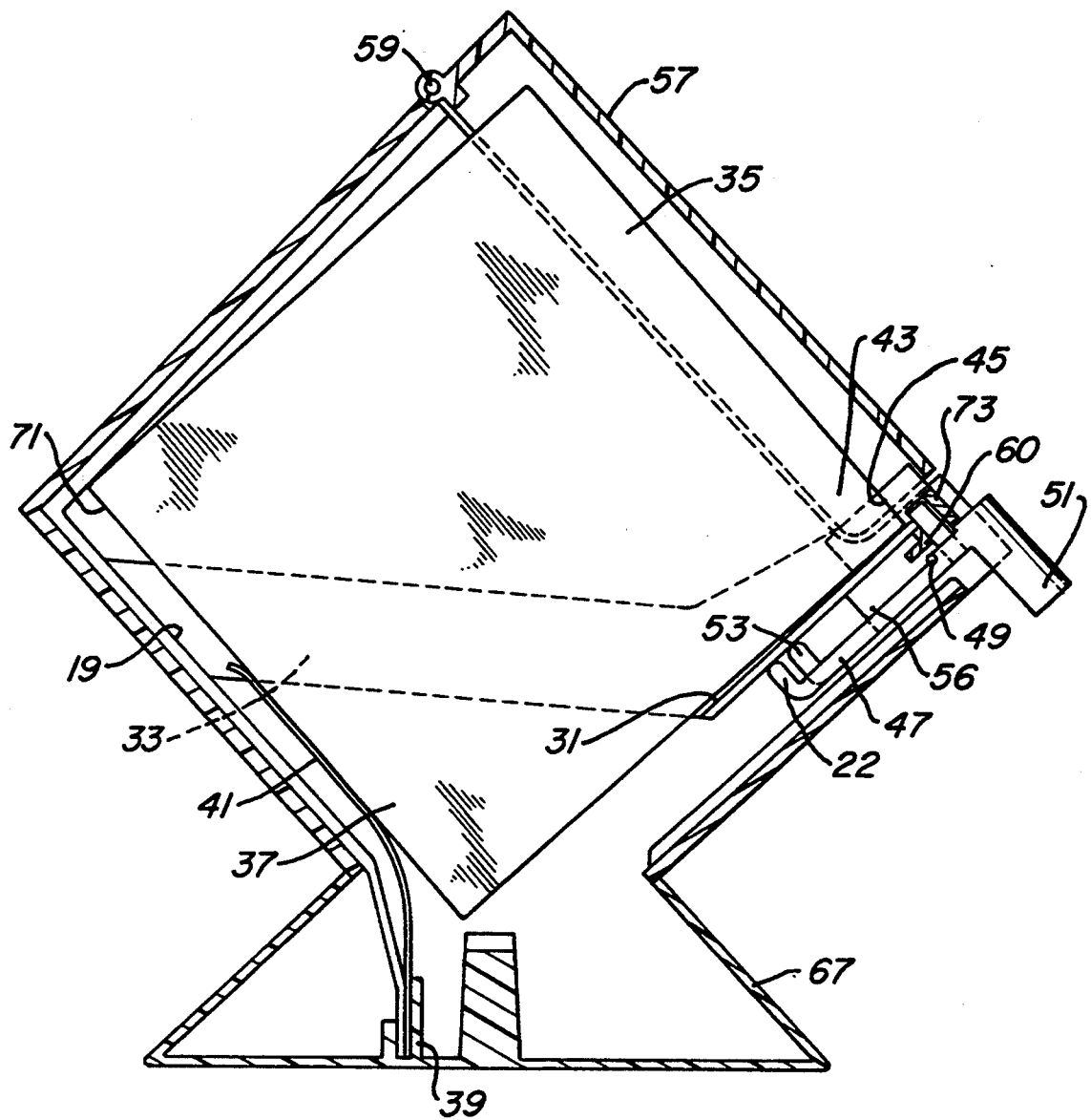
FIG. 3 is a cross-sectional view similar to FIG. 2 but showing the device with a disk inserted within one of the storage slots.

As shown in FIG. 2, a plurality of dividers 29 are located within the open interior 25 of the storage body 13 and extend generally perpendicular to the bottom wall 17 thereof. The dividers 29 are spaced apart a preselected distance within the open interior 25 of the storage body 13 to thereby define a plurality of slots for receiving disks to be stored by the device. The dividers 29 can be provided in the form of a frame having a plurality of equidistantly spaced track walls, each of which has a foot region 31 which is connected by gently sloping track sidewalls 33 to the rear wall 19 of the storage body 13. As shown in FIG. 3, when a diskette 35 is inserted within the storage body, the leading corner 37 thereof first passes within that portion of the slot defined by the two adjacent foot regions (31 shown in FIG. 3). As the disk moves further within the slot, the angled track sidewalls assist in straightening the disk to a vertical position. It is only necessary that the user align the bottom edge of the disk with that portion of the slot defined by the foot regions of the dividers 29.

Biasing means, located within at least selected ones of the slots, are provided for normally urging a disk outwardly from a storage position, as shown in FIG. 3, to an extended, retrieval position. Preferably, the biasing means comprises a spring comb 39 having a plurality of leaf spring teeth 41. Each leaf spring tooth is associated with a selected slot within the open interior 25 of the storage body 13. As shown in FIGS. 2 and 3, the leaf spring teeth are moveable from a relaxed position (FIG. 2) to a tensed position (FIG. 3) as the disk 35 is inserted into a selected slot.

A retaining means is also located on the storage body 13 for engaging the trailing corner 43 of the diskette 35 as the diskette is moved to the storage position shown in FIG. 3 and the biasing means is moved to the tensed position. The retaining means can conveniently provided as a lip (45 in FIG. 2) formed on the storage body adjacent the opening 27 thereto.

A release means is also provided for disengaging the retaining means and allowing the biasing means to urge the disk outwardly from the storage position shown in FIG. 3 to the extended, retrieval position. The release means is preferably a lever 47 which is slidably mounted on the storage body 13 adjacent the retaining lip 45. As shown in FIGS. 2 and 3, the lever 47 is pivotable about a point 49 when the tab 51 is depressed so that the actuating end 53 pivots from the relaxed position shown in FIG. 3 to the actuated position shown in FIG. 2, whereby the lever contacts the bottom portion of the disk being retrieved for urging the trailing corner 43 of the disk over the retaining lip 45. As the trailing corner 43 of the disk clears the retaining lip 45, the leaf spring tooth 41 urges the diskette upwardly and outwardly so that it protrudes slightly above the remaining disk stored in the remaining slots of the storage body.

The lever 47 is mounted on a slider block 56 and is spring loaded in the relaxed position shown in FIG. 3 by a leaf spring 22 which acts on the floor member 31. Slider block 56 moves on a rail 60 on storage body 13 and can be moved along the rail to align the lever with the desired slot in the interior of the storage body. In this way, the lever is individually indexable against individual slots in the storage body for retrieving disks stored therein on an individual basis as the lever slides along the lip region of the body.

The storage body 13 preferably has a pivoting lid 57 attached thereto by means of a hinge 59 for closing the opening 27 therein. The pivoting lid has an inside surface 61 and an outside surface 63, the inside surface 61 being adapted to receive a disk title card 65 which can be held in place by any convenient means, such as by a suitable adhesive. The disk title card 65 can be used to provide a numbered index of the disks stored in the individual slots of the storage body.

The storage body 13 is provided with an integral base 67 which orients the opening (27 in FIG. 2) at an angle to an associated support surface (69 in FIG. 2), whereby the opening into the interior 25 of the storage body 13 more directly faces a user of the device. The "floating diamond" shape of the device is both aesthetically pleasing and "looks up" at an operator for ease of use.

In operation, the pivoting lid 57 is moved to the open position shown in FIG. 2. A disk is started in the foot region 31 of the divider frame. As it is pushed in the direction of the rear wall 19, the angled track sidewalls 33 straighten the disk to a vertical position, it only being necessary for the operator to align the bottom portion of the disk. As the rear edge 71 of the disk contacts the leaf spring tooth 41, it moves it rearwardly to the tensed position shown in FIG. 3. As the trailing corner 43 of the disk 35 clears the lip 45, the disk snaps into the stored position shown in FIG. 3.

To retrieve a disk, the number of the desired disk is selected from the disk title card 65. The matching number is located on a numbered scale 73. The lever 47 is then moved along its rail 60 to align the lever with the desired number on the scale 73. When the actuating end 53 of the lever 47 is moved in a clockwise direction about the pivot point 49, the trailing end of the disk 35 is pushed above the retaining lip 45, allowing the leaf spring tooth 41 to push the disk forwardly to the retrieval position.

An invention has been provided with several advantages. The disk storage device of the invention is simple in design and economical to manufacture. The attractive floating diamond configuration is aesthetically pleasing and also properly orients the storage body for greatest ease of use. The unique track and slot system within the storage body interior automatically straightens a disk once the operator aligns the bottom corner of the disk with the slot. The leaf spring and retaining lip structure are simple and reliable in operation and securely engage the disk within its selected slot. The pivoting lever provides a convenient and reliable means for disengaging a selected disk. The lever mechanism, along with the lid and index sheet, allow a desired disk to be quickly located and individually retrieved from among a plurality of adjacent, stored disks.

While the invention has been shown in only one of its forms, it is not thus limited but is susceptible to various changes and modifications without departing from the spirit thereof.

What is claimed is:

1. A disk storage device adapted to be rested upon a support surface, comprising:

a storage body having a top wall, a bottom wall, a rear wall and opposing side walls which together define an initially open interior, the storage body walls, when assembled, defining an opening into interior thereof;

a plurality of dividers located within the open interior of the storage body and extending generally perpendicular to the bottom wall thereof, the dividers being spaced apart a preselected distance within the open interior to thereby define a plurality of generally vertically oriented slots for receiving disks to be stored by the device;

a spring comb having a plurality of leaf spring teeth, each leaf spring tooth being associated with a selected slot within the open interior of the storage body for normally urging a disk outwardly from a storage position, principally within the open interior, to an extended, retrieval position, each leaf spring tooth being movable from a relaxed position to a tensed position as a disk is inserted into a selected slot;

a retaining lip integrally formed on the storage body for engaging a corner portion of a disk located within a slot as the disk is moved to the storage position and the leaf spring tooth is moved to the tensed position;

release means for disengaging the corner portion of the disk from the retaining lip and allowing the leaf spring tooth to urge the disk outwardly from the storage position to the extended, retrieval position; and a base means formed as a part of the storage body for orienting the storage body at an angle greater than zero with respect to the associated support surface, whereby the opening into the interior thereof more directly faces a user of the device.

2. The disk storage device of claim 1, wherein the release means is a lever slidably mounted on the storage body adjacent the retaining lip, the lever being pivotable between a relaxed position and an actuated position in contact with a portion of the disk being retrieved for urging the disk out of contact with the retaining lip.

3. The disk storage device of claim 2, wherein the lever is individually indexable against individual slots in the storage body for retrieving disks stored therein on an individual basis as the lever slides along the lip region of the body.

4. The disk storage device of claim 3, wherein the storage body has a pivoting lid attached thereto for closing the opening therein, the pivoting lid having an inside surface and an outside surface and wherein the inside surface is adapted to receive a disk title card which provides a numbered index of stored disks.

5. A method of storing a plurality of disks, the method comprising the steps of:

providing a storage body having a top wall, a bottom wall, a rear wall and opposing side walls which together define an initially open interior;

locating a plurality of dividers within the open interior of the storage body which extend generally perpendicular to the bottom wall thereof, the dividers being spaced apart a preselected distance within the open interior to thereby define a plurality of slots for receiving disks to be stored;

providing biasing means within at least selected ones of the slots for normally urging a disk outwardly from a storage position, principally within the open interior, to an extended, retrieval position, the biasing means being movable from a relaxed position to a tensed position as a disk is inserted into the slot;

forming a retaining lip on the storage body;

inserting a disk into a selected slot and moving the disk in the direction of the biasing means until a portion of the disk engages the retaining lip and the biasing means is moved to the tensed position;

providing release means for disengaging the disk from the retaining lip;

actuating the release means, thereby allowing the biasing means to urge the disk outwardly from the storage position to the extended, retrieval position;

wherein each slot in the storage body is formed between an associated set of dividers, each divider having a foot region which is connected by angled track sidewalls to the rear wall of the storage body; and wherein, when a disk is started in a respective foot region of a slot and pushed in the direction of the rear wall, that the angled track sidewalls assist in straightening the disk to the vertical position as the disk moves from the retrieval position to the storage position.

* * * * *